United States Patent
Bayer et al.

(10) Patent No.: US 8,258,926 B2
(45) Date of Patent: Sep. 4, 2012

(54) METHOD FOR AUTOMATICALLY CHECKING IN PASSENGERS AND THEIR LUGGAGE

(75) Inventors: Thomas Bayer, Virginia Water (GB); Balthazar-Simon Ten Berge, Seligenstadt (DE); Wolf-Stephan Wilke, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 470 days.

(21) Appl. No.: 12/469,999

(22) Filed: May 21, 2009

(65) Prior Publication Data

US 2009/0295544 A1 Dec. 3, 2009

(30) Foreign Application Priority Data

May 27, 2008 (DE) .......................... 10 2008 025 248

(51) Int. Cl.
*H04Q 5/22* (2006.01)
(52) U.S. Cl. ....... 340/10.1; 235/375; 700/225; 700/228; 705/5
(58) Field of Classification Search ................ 340/10.1, 340/572.1; 235/375, 384; 705/5; 700/225, 700/226, 228–230
See application file for complete search history.

(56) References Cited

U.S. PATENT DOCUMENTS

| | | | |
|---|---|---|---|
| 6,222,452 B1 * | 4/2001 | Ahlstrom et al. | 340/572.1 |
| 7,777,629 B2 * | 8/2010 | Lee et al. | 340/10.1 |
| 2003/0085268 A1 * | 5/2003 | Kruse et al. | 235/375 |
| 2004/0102979 A1 | 5/2004 | Robertson et al. | |
| 2006/0145852 A1 * | 7/2006 | McElhannon et al. | 340/572.1 |
| 2007/0109127 A1 | 5/2007 | Johnson et al. | |
| 2009/0091452 A1 * | 4/2009 | Himmel | 340/572.1 |

FOREIGN PATENT DOCUMENTS

| | | |
|---|---|---|
| DE | 10007127 A1 | 8/2001 |
| DE | 10226167 A1 | 12/2003 |

* cited by examiner

*Primary Examiner* — Thomas Mullen

(57) ABSTRACT

A method for automatically checking in passengers and their luggage by an electronic input of the passenger data or travel data by the passenger himself into an automatic check-in terminal is provided. In the automatic check-in terminal, possibly following selection of various criteria, the boarding pass and one or more information media for attachment to the luggage are created and output. The information medium created is a luggage tag which is easy to affix to the luggage item and which contains, in machine-readable form, at least all the data and information which are required for a later generation of an internationally standardized, preferably self-adhesive luggage band which is affixed to the luggage item within a conveying and sorting system in addition to the luggage tag.

11 Claims, 1 Drawing Sheet

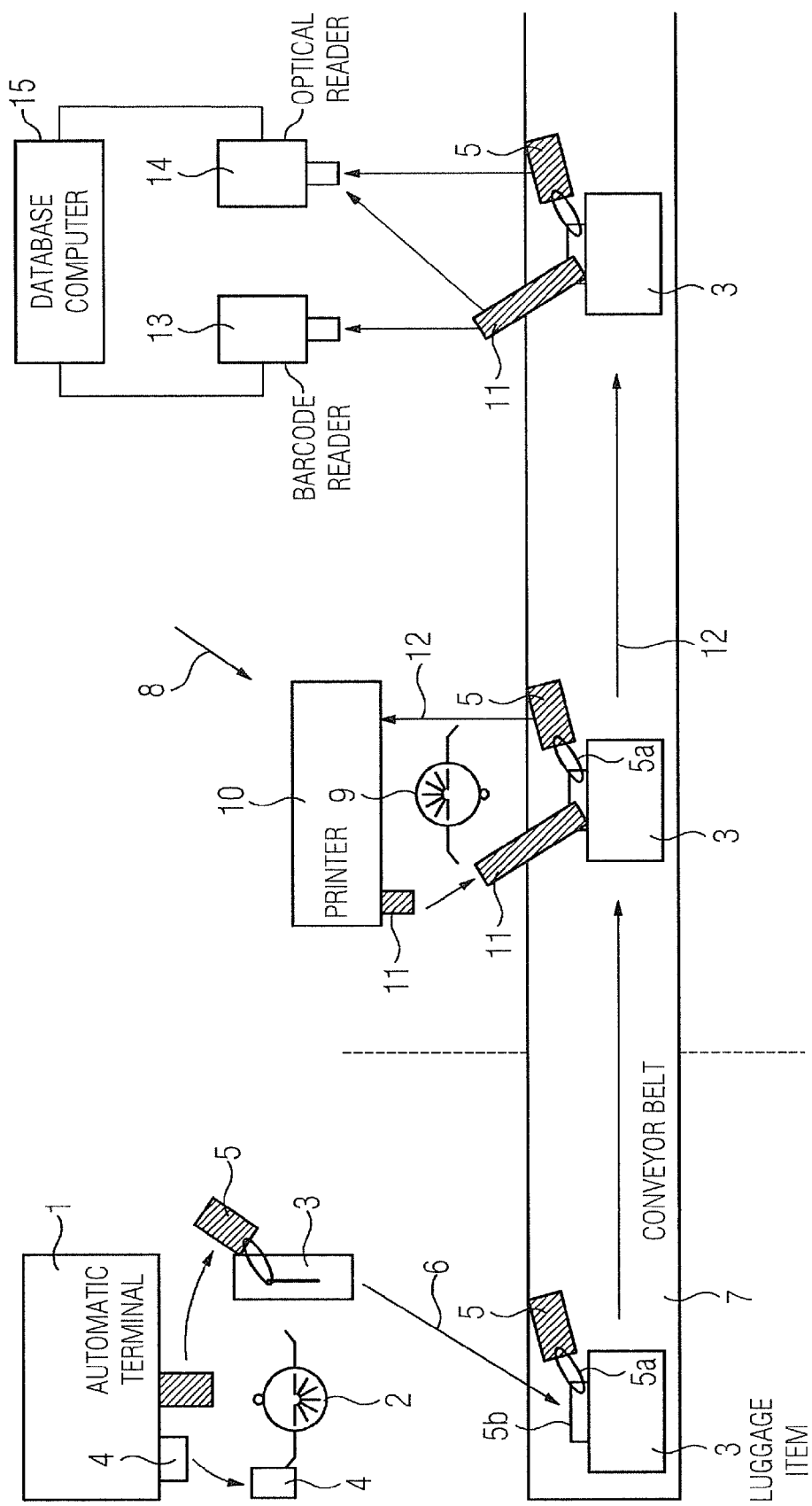

METHOD FOR AUTOMATICALLY CHECKING IN PASSENGERS AND THEIR LUGGAGE

CROSS REFERENCE TO RELATED APPLICATIONS

This application claims priority of German Patent Application No. 10 2008 025 248.4 DE filed May 27, 2008, which is incorporated by reference herein in its entirety.

FIELD OF INVENTION

The invention relates to a method for automatically checking in passengers and their luggage by means of electronic input of the passenger and/or travel data by the passenger himself into an automatic check-in terminal in which, possibly following the selection of various criteria, the boarding card (boarding pass) and one or more information media for attachment to the luggage are created and output, the passenger being obliged to affix one of the previously created information media to each checked-in luggage item before transferring the luggage item to the conveying and sorting system.

The solutions described below can be used for any type of travel luggage, specifically for luggage which the traveler does not carry as hand luggage but rather checks in to a conveying and sorting system for stowage in the luggage compartment of the means of transport. Even though the solution which follows relates particularly to flight luggage, the invention can be used for other means of transport, as it were, such as cruise ships, where it is important to receive a large number of luggage items and to route them to a destination in the shortest possible time and with little outlay. Nevertheless, the invention is described below by way of example in connection with flight luggage handling.

BACKGROUND OF INVENTION

At present, when checking in at the check-in desk or check-in terminal, every flight luggage item has a band attached to it as an information medium, which is standardized by the International Air Transport Association, (IATA) and is called the "IATA Baggage Tag". This tag firstly contains an ID barcode as specified by the IATA, but secondly also contains plain-text information, e.g. about the destination airport and the transfer airport. However, only the barcodes on these tags are read on the luggage sorting systems in the airports. For various reasons, great differences in quality arise when the information media are read, however.

It is known that the recognition rates for "transfer luggage" are usually much lower than the recognition rates for luggage checked in at the departure airport itself. The information media (IATA Baggage Tag) on the transfer luggage have often already been bent or damaged by the preceding processes, or are missing entirely. The result of this is that a relatively large proportion of the transfer luggage is misrouted or ends up being encoded manually, with a corresponding time loss in processing. This time loss in turn results in some of the luggage items not reaching the connecting aircraft in good time. This is a great problem for the airlines, since it is accompanied by losses of service quality and considerable costs for subsequent delivery of the luggage.

Another problem is that the barcode does not contain any destination information; this is because this information is held on database computers, e.g. the Sort Allocation Computer of the baggage system or the databases of the airlines (BSM code), which must first be queried. This results in the destination information being transmitted with a delay, which means that these luggage items likewise end up being encoded manually.

It is also essential to identify the luggage items in the context of forwarding the data record to the airlines and to the security authorities (BSM processing).

Besides the more rapid and more secure automatic processing of the luggage items, airlines are also interested in streamlining measures for checking in the luggage. Although it is still relatively simple for passenger check-in to be accomplished by a machine, this is actually much more difficult for luggage check-in. This is because attempts have shown that it is not practical for the "IATA Baggage Tag" to be attached by the passenger himself. The reason is the design as a lengthy adhesive tag whose protective layer needs to be peeled off in order to join the adhesive-coated layers to form a loop around a carrying handle on the luggage item. The adhesive tag should be stuck together relatively precisely during attachment, since otherwise it can become disadvantageously coupled to the luggage item as a result of protruding adhesive layers, which in turn can result in a reduction in the reading rates.

The IATA has produced a study with the aim of solving the problem of poor reading rates using RFID technology. The idea is to extend the "IATA Baggage Tag" by an integrated RFID tag. However, the costs of a tag would be increased approximately tenfold as a result. In addition, it would become necessary to convert/replace the tag printers, and also to install RFID reading tunnels on the luggage sorting systems. Overall, this approach to a solution must be rated as more costly, which means that alternatives are sought.

SUMMARY OF INVENTION

An object of the present invention is to provide a method for checking in traveler's luggage which significantly improves the subsequent reading and recognition rate for the information media on the luggage items and at the same time keeps down the cost outlay. In addition, the traveler involved in the process is meant to be able to perform his activity easily.

The invention modifies the method of the type in question which is outlined at the outset by virtue of the information medium created being a luggage tag which is easy to affix to the luggage item and which contains, in machine-readable form, at least all the data and information which are required for later generation of an internationally standardized, preferably self-adhesive luggage band (IATA Baggage Tag) which is affixed to the luggage item within the conveying and sorting system in addition to the luggage tag.

Advantageously, the baggage tag also contains additionally readable destination information which still allows the luggage item to be sorted even if the response from the database computer is delayed.

The introduction of a luggage tag which the passenger is easily able to affix to the luggage item, instead of the previously customary IATA Baggage Tag, which is difficult for the passenger to handle, results in a simple "self-check-in" process not only for the passenger himself but also for his luggage items. The passenger checks in easily on a machine. The machine continues to print the boarding card (the boarding pass) and additionally, in line with the invention, also a, or, depending on the number of luggage items, a plurality of luggage tag(s), which can also be called a baggage pass or baggage passes, similar to the boarding pass, and which first of all replace the printing of the IATA Baggage Tags.

According to one embodiment of the invention, the luggage tag (Baggage Tag) is created and output as an RFID tag with a fixed ID code which contains all the necessary information. Alternatively, the luggage tag, or the baggage pass, can be created using wear-resistant, preferably tear-resistant, paper, cardboard or plastic, but still comparable with the boarding card, which is also likewise created and output by the machine. The luggage tag (baggage pass) can, if printed on the same paper as the boarding card (boarding pass), in principle also be created via the same printer. If a different (higher-quality) paper or plastic is preferred, a second printer would be required in a machine.

If the luggage tag is in the form of an RFID tag with a fixed ID code, it can be associated with the luggage item and with the passenger, or may be already arranged on the luggage item, when checking in on the machine.

In line with the invention, the luggage tag is also printed with additionally readable destination information which allows the luggage item to be sorted even if the response from the database computer is absent or delayed.

According to a further feature of the invention, it may be advantageous if the luggage tag (baggage pass) contains the destination address for the passenger in plain text so as to assist arrival services, e.g. the delivery of the luggage.

Advantageously, in accordance with another feature of the invention, the luggage tag is connected to the luggage item using an easily manageable connection technique. Suitable examples are elastic bands, plastic straps or similar known durable affixing techniques which can easily be affixed to the handle or the like of the luggage item.

When the passenger has affixed the luggage tag output by the machine to the luggage item, the passenger places the luggage item onto a bulk material handler (conveyor belt) which conveys the luggage item to a central workstation, where the following successive work steps are performed:
  a. the information is read from the luggage tag,
  b. the read data are transmitted to a printing unit,
  c. a standardized luggage band is printed,
  d. the standardized luggage band is attached in addition to the luggage tag.

The reading of the luggage tag in step a. can, as known, be performed using a handheld barcode reader which communicates with the printer for the "IATA Baggage Tag", or can be performed electronically in the case of an RFID tag. The fact that the process step of attaching the standardized luggage band, the "IATA Baggage Tag", can be centralized (and therefore streamlined) and no longer needs to be performed at multiple individual check-in desks saves not only time and therefore cost but also minimizes the sources of error as a result of bands being attached by passengers who are not used to this activity.

The luggage item then passes through the luggage conveying and sorting system. Besides the (already present) barcode reader, the invention also has a further optical or electronic reading device installed there which records one or more images or pieces of information, both from the "IATA Baggage Tags" and from the additional luggage tag (baggage pass), and evaluates the information thereon or routes it for evaluation to the database computer for the purpose of evaluation and/or for the purpose of consistency with the information recorded by the barcode reader.

The optical or electronic reading device again attempts to record the barcode and also other elements (e.g. text information) on the "IATA Baggage Tag". The additional reading device and the additional luggage tag (baggage pass) provide many more opportunities and chances for recognition, and it can therefore be expected that the probability of successful reading on the luggage item will be significantly increased.

The invention is advantageous both for the airlines and for the passengers. The airlines would like to motivate the passengers for "self-check-in", since they can save personnel costs as a result. In return, although the passengers need to accept a slight inconvenience, namely attaching the luggage tag (baggage pass), this allows them to be promised a higher quality of service and greater probability of their luggage arriving on time. This is a relatively great motivation for the passenger.

Advantages are also obtained for the machine manufacturers, though. The functionality of printing the luggage tags can be integrated into their products. The considerable cost advantages of the invention should not be underestimated. The use of RFID luggage tags also has the advantage that the RFID tags do not need to be standardized worldwide, and airlines could operate locally with proprietary RFID tags, since the standardized IATA information media are printed and attached to the luggage later for transport.

BRIEF DESCRIPTION OF THE DRAWING

An exemplary embodiment of the invention is illustrated schematically in the single FIGURE of the drawing and is described below with reference thereto.

DETAILED DESCRIPTION OF INVENTION

In the drawing, 1 describes an automatic terminal which is used by the passengers for what is known as "self-check-in". As a result of input of the booking data, for example using the credit card or a frequent flyer card, the machine prints the boarding card 4, under menu guidance, which the passenger 2 has requested by inserting the card. The passenger 2 wishes to check in a flight luggage item 3 which is to be transported in the hold of the aircraft. In line with the invention, the automatic terminal 1, upon request, prints not only the boarding card 4 but also a luggage tag 5 (also called a baggage pass) which the passenger affixes to the handle 5b of the flight luggage item 3 using an elastic band 5a. As symbolized by the arrow 6, the passenger 2 then place the flight luggage item 3 provided with the luggage tag 5 onto the conveyor belt 7, which transports the luggage item 3 to a workstation 8 further away. There, a worker 9 has the task of using a handheld barcode reader, for example, to read the information printed as a barcode on the luggage tag 5, which information has been printed on the luggage tag 5 in the automatic terminal 1, and to input it into the printer 10, which uses this information to create the "IATA Baggage Tag" 11. This Baggage Tag 11 comprises a strip-like band, one side of which is provided with a strong adhesive layer, so that when a protective film has been peeled off, this band can be looped around the handle of the luggage item 3 and can be fixed by pressing together the adhesive faces. The luggage tag 5 which has been used to read the information and to transfer it to the IATA baggage tag 11 remains affixed to the handle of the luggage item 3 and is routed to the sorting system (not shown in detail) with the luggage item 3 in the direction of the arrow 12. The sorting system has not only the reader 13 for the barcode on the IATA Baggage Tag 11 installed but also a further optical reader 14 which can be used to read the information on the luggage tag 5. In addition, the optical reader 14 is also able to request information from the IATA Baggage Tag 11, so that both the information from the IATA Baggage Tag and the information from the luggage tag 5 can be received and matched with one another, or if one of the two information media is illegible then at least the information from the redundant information medium can be read. Further, the barcode reader 13 and the optical reader 14 are connected to a database computer 15 for the purpose of evaluation and/or consistency of the data recorded by the barcode reader 13 and the optical reader 14. The luggage tag 5 can also contain plain-text information which allows the system's personnel to route the luggage item 3 to the correct destination in a very short time in the event of automatic reading problems.

The invention claimed is:

1. A method of automatically checking in passengers and their luggage, comprising:
   inputting electronically passenger data into an automatic check-in terminal by a passenger himself;
   creating and outputting a boarding pass based on the passenger data by the automatic check-in terminal;
   creating and outputting a first luggage tag based on the passenger data by the automatic check-in terminal, wherein the first luggage tag contains, in machine-readable form, data required for generating a second luggage tag, which is an internationally standardized luggage band;
   attaching the first luggage tag to a luggage item by the passenger;
   transferring the luggage item having the first luggage tag to a conveying and sorting system;
   generating the second luggage tag, which is the standardized luggage band; and
   attaching the second luggage tag, which is the standardized luggage band, to the luggage item in addition to the first luggage tag.

2. The method as claimed in claim 1, wherein the first luggage tag is created and output as a RFID tag with a fixed ID code.

3. The method as claimed in claim 2, wherein the first luggage tag is printed or programmed with additional destination information of the passenger.

4. The method as claimed in claim 2, wherein the first luggage tag comprises a destination address of the passenger in plain text.

5. The method as claimed in claim 2, wherein the first luggage tag is connected to the luggage item using elastic bands or plastic straps.

6. The method as claimed in claim 1, wherein the first luggage tag is created and output using tear-resistant paper, cardboard or plastic.

7. The method as claimed in claim 1, wherein the first luggage tag is printed or programmed with additional destination information of the passenger.

8. The method as claimed in claim 1, wherein the first luggage tag comprises a destination address of the passenger in plain text.

9. The method as claimed in claim 1, wherein the first luggage tag is connected to the luggage item using elastic bands or plastic straps.

10. The method as claimed in claim 1, wherein the generating of the second luggage tag, which is the standardized luggage band, comprises:
    placing the luggage item onto a bulk material handler of the conveying and sorting system after the luggage item has been provided with the first luggage tag,
    conveying the luggage item to a workstation,
    reading the data from the first luggage tag;
    transmitting the read data to a printing unit; and
    printing the second luggage tag, which is the standardized luggage band.

11. The method as claimed in claim 10, wherein the conveying and sorting system comprises a barcode reader and an additional optical or electronic reading device, wherein the barcode reader and the additional optical or electronic reading device record the data located on the first luggage tag or the second luggage tag after the luggage item has been provided with the first luggage tag and the second luggage tag, which is the standardized luggage band, in order to sort the luggage item by the conveying and sorting system.

* * * * *